J. H. FOX.
EDUCATIONAL DEVICE.
APPLICATION FILED AUG. 7, 1915.
1,218,993.
Patented Mar. 13, 1917.
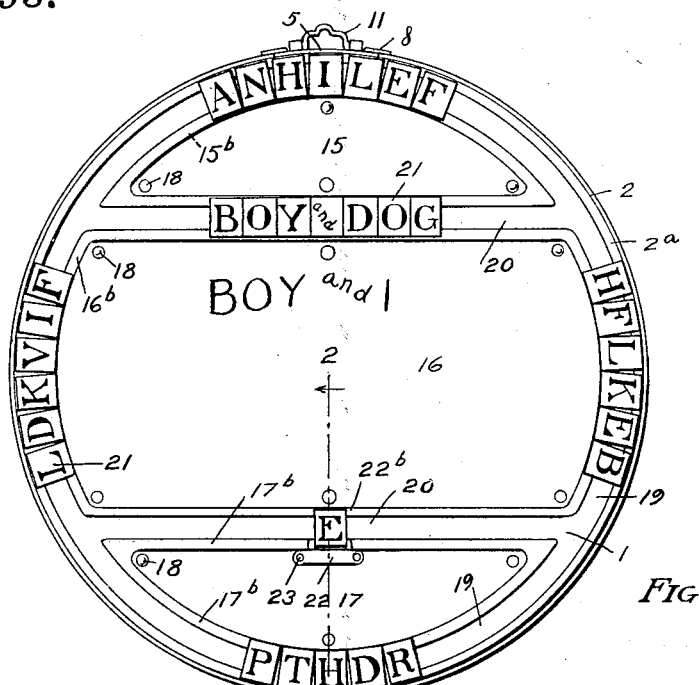
FIG. 1.
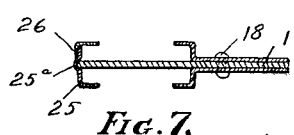
FIG. 7.
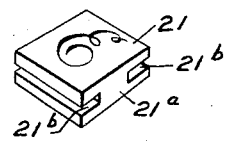
FIG. 5.
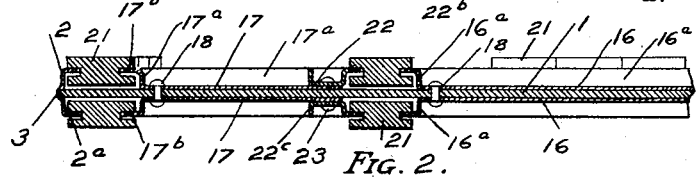
FIG. 2.
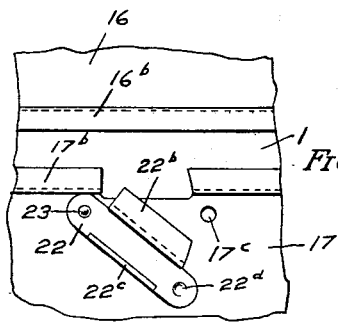
FIG. 3.
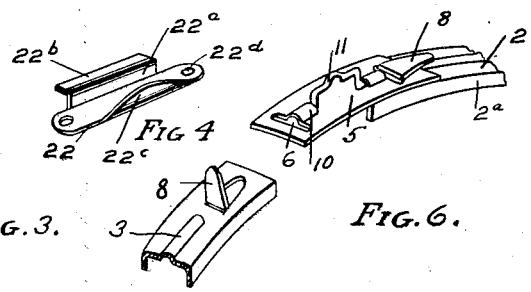
FIG 4.
FIG. 6.
INVENTOR
John H. Fox
BY Hull, Smith, Brock & West
ATT'YS

UNITED STATES PATENT OFFICE.

JOHN H. FOX, OF BEREA, OHIO.

EDUCATIONAL DEVICE.

1,218,993.	Specification of Letters Patent.	Patented Mar. 13, 1917.

Application filed August 7, 1915. Serial No. 44,186.

*To all whom it may concern:*

Be it known that I, JOHN H. FOX, a citizen of the United States, residing at Berea, in the county of Cuyahoga and State of Ohio, have invented a certain new and useful Improvement in Educational Devices, of which the following is a full, clear, and exact description, reference being had to the accompanying drawings.

This invention relates to improvements in that class of device known as educational boards that are used for entertaining and instructing children, such devices comprising generally a supporting member whereon a series of buttons are shiftable, the buttons bearing letters of the alphabet, numerals, and other inscriptions, and being capable of arrangement upon the supporting member in words, sentences, and other congruous groups.

The objects of the invention are to provide a device of the aforesaid class that is very durable; economical of manufacture; convenient of use; wherein both sides of the supporting member are provided with a series of buttons; and wherein means are provided whereby the buttons may be turned over so that the opposed faces of each button may bear different characters, thereby increasing or doubling the capacity and utility of the device.

The last mentioned of the foregoing objects is considered of marked importance for it allows the subject matter of the device to be altered according to the advancement of the pupil. For instance, printed letters may appear upon one side of the buttons, while the opposite faces of the buttons may bear the corresponding script type. Therefore, when a child has mastered one, the buttons may be reversed and he may be taught the other.

I also consider the construction involving an integral or unitary supporting plate upon the opposed sides of which are carried the guides for the buttons, an important feature of the invention as it provides a simple and very durable structure, and one that may be cheaply and easily manufactured.

In the accompanying drawing I have illustrated an educational device wherein the above and further objects are attained, and while I will proceed to describe the same in detail, I wish to be understood as not limiting myself to the structural details thereof further than is required by the terms of the annexed claims and is rendered necessary by the state of the prior art.

In the drawing, Figure 1 represents the device in elevation; Fig. 2 is a section on line 2—2 of Fig. 1; Fig. 3 is an enlargement of a portion of Fig. 1, showing the gate partly open through which the buttons may be removed for the purpose of inverting them; Fig. 4 is a perspective view of the gate; Fig. 5 is a perspective of one of the buttons, Fig. 6 is a detail in perspective of means for connecting the ends of the channel binder and for suspending the device from a suitable support; and Fig. 7 a detail of a modification.

The device is composed of a supporting plate 1 that may be made of metal or other suitable material and preferably circular in shape. An inwardly opening channel binder 2 surrounds the plate 1, and the transverse center of the web of the channel binder is bent to form a groove, as shown at 3, for the reception of the periphery of the supporting plate. I find it desirable to make the channel binder 2 of thin sheet metal, and when formed as described, the same may be drawn tightly about the edge of the supporting plate and its ends may be secured together in any suitable manner, although I prefer to employ the means illustrated in detail in Fig. 6. This means consists of a plate 5 having a transverse slot 6 at each end through which one of the tongues 8 that are struck from the ends of the binder 2 is arranged to be passed and bent back over the end of the plate, as clearly shown in the aforesaid figure. Portions of the material of the plate 5 between its center and the slots 6 are punched upward to form bearings 10 within which are journaled the ends of a wire loop or hanger 11. When the ends of the binder are thus secured together the binder will be held against shifting transversely of the edge of the supporting plate by reason of the connection afforded by the groove 3, as already described.

Face plates 15, 16, 17 are secured to opposite sides of the supporting plate, preferably by rivets 18 which extend through opposed face plates and the supporting plate 1. It will be understood, however, that these plates may be fastened to the supporting plate by other means, such as welding, if desired. It will be observed that the plates 15, 16, and 17 constitute segments or sections of a circle. When mounted upon the supporting plate as illustrated, their curved edges combine to form a circle that is spaced a short distance inward from the channel binder 2. Also it will be noted that the straight edges of adjacent plates are separated a distance substantially equal to the spacing between their curved edges and the inner edges of the channel. All edges of each of the aforesaid plates are turned upward substantially at right angles to their body portions and then outward in a plane substantially parallel to their body portions so that, in the vicinity of the edge of each plate, the same is substantially Z shape in cross section. The peripheral wall of each of the plates 15, 16 and 17 is referred to by the reference numeral of the plate, augmented by the exponent $a$, and the flange thereof is designated by the same reference character, with the exponents $b$. It will be seen, especially from Fig. 2, that the flange $2^b$ of the channel binder 2 and the flanges $15^b$, $16^b$, and $17^b$ of the aforesaid face plates are in substantially the same plane, and correspond in elevation to the opposed flanges of the straight sides of the face plates. The space between the curved edges of the face plates and the channel binder 2 constitutes a storage slot 19, and the spaces between the straight sides of adjacent face plates form branch slots 20, and within these various slots are guided buttons 21. Each button has a pair of opposed heads that are connected by a neck $21^a$ that extends transversely of the heads from one side to the other thereof. The grooves $21^b$ thus formed between the ends of the opposed heads, receive the flanges of the face plates and binder, as clearly illustrated in Fig. 2. It has already been explained that the buttons have imprinted thereon letters of the alphabet, numerals, etc.

Now, by reason of construction above described, the user of the device may shift the buttons about the storage slot 19 and into either one of the branch slots 20 in proper arrangement to form words, sentences or other desired groups. Although I claim it has no part of my present invention, I prefer to treat the surfaces of the face plates 16 in such manner as to enable the user of the device to write thereon with chalk, slate, or lead pencil and to conveniently erase such markings therefrom.

In order to increase the utility and capacity of the device, both faces of each button are provided with characters. In cases where a printed letter appears upon one side of the button, for instance, the script of the same letter may be present upon the other. To allow removal of the buttons from the device for the purpose of inverting them, I provide a gate which is preferably located within the straight side of each of the face plates 17, the vertical wall $17^a$ and flange $17^b$ of the straight side of each of said plates being interrupted at substantially its transverse center by the cutting away of a portion of such wall and flange, the portion removed being of a length somewhat greater than the width of a button. The gate which normally closes the aforesaid opening is designated 22 and consists preferably of an elongated plate from one edge of which rises a wall $22^a$ that corresponds to the vertical wall $17^a$ of the aforesaid plate, and a flange $22^b$ extends at substantially right angles from the upper edge of the wall $22^a$, and corresponds to and is in the plane of the flange $17^b$ of the face plate. A finger hold $22^c$ extends upward from the edge of the plate 22, opposite the wall $22^a$. One end of the plate 22 is pivotally secured to the device by means of a rivet 23, and the opposite end of the plate is provided with a depression $22^d$ that is adapted to be received by an aperture $17^c$ in the face plate, when the gate is closed. The resiliency of the plate causes the depression $22^d$ to snap into the aperture $17^c$ and hold the gate against accidental displacement. As previously explained, there is preferably a gate in each side of the board, and for convenience, the same rivet 23 may be used to pivotally connect each gate to its respective face plate.

When it is desired to remove the buttons for the purpose of turning them over to reveal their opposite faces, the gate may be opened somewhat farther than illustrated in Fig. 3, and the buttons moved into the lower branch slot 20 and withdrawn through the opening in the wall $17^a$.

In Fig. 7 I have shown a modification of my invention wherein the channel member that is applied to the edge of the supporting plate 1 is composed of two continuous bands or rings 25 and 26, each of which is L shaped in cross section, the flange of the band 25 which corresponds to the stem of the L having a bead $25^a$ that is occupied by the edge of the supporting plate, the aforesaid flange yielding sufficiently to allow the edge of the plate to pass into the bead, in assembling the device. The corresponding flange of the band or ring 26 telescopes over the afore said beaded flange of the band or ring 25, as clearly shown in the drawing. These engaging portions of the rings may be secured together in any suitable manner. In practice, it is found that by dipping the device in a suitable paint or enamel, principally for the purpose of artistically finishing the device, the bands or rings 25 and 26, and the edge of the supporting plate 1, are firmly secured together.

Having thus described my invention, what I claim is:—

1. A device of the character set forth comprising a supporting plate, an inwardly opening channel member applied to the periphery of the supporting plate, the side flanges of the channel member being spaced from the opposite sides of the plate, a member applied to each side of the supporting plate and having a wall that is opposed to the web of the channel member and a flange that extends from the wall toward the flange of the channel, and in substantially the plane thereof, and buttons having each a pair of opposed heads that are connected by a neck, the necks of the buttons being slidable between the flanges of the aforesaid members.

2. A device of the character set forth comprising a supporting plate, a pair of plates secured thereto, the last mentioned plates having edges that are spaced apart and are substantially parallel, the adjacent edges of said plates being turned at substantially right angles to their body portions and then toward each other, and a plurality of buttons having each a pair of opposed heads that are connected by a neck, the necks of the buttons being slidable between the adjacent edges of the aforesaid plates.

3. A device of the character set forth comprising a supporting plate, a member surrounding said plate and having a flange extending inward over the plate and spaced therefrom, and face plates secured to the supporting plate having peripheral flanges extending toward and in substantially the plane of the flange of the aforesaid member, the adjacent face plates having opposed flanges that are in substantially the plane of the first mentioned flanges, and buttons guided between opposed flanges of the face plates and aforesaid member, each button comprising a pair of opposed heads that are connected by a neck that is slidable between said flanges.

4. A device of the character set forth comprising a supporting member having a storage slot and a branch slot that extends from the storage slot, buttons that are slidable within the aforesaid slots, each button consisting of a pair of opposed heads that are connected by a neck which is slidable between the opposed edges of the aforesaid slots, one edge of one of the slots having an opening through which the aforesaid buttons may be removed, a gate hingedly connected to the supporting member for normally closing said opening, and means for retaining the gate closed.

5. A device of the character set forth comprising a supporting plate, a member secured to each side thereof, and having a peripheral flange that is spaced from the adjacent side of the supporting plate and inwardly from the edge thereof, and a pair of opposed continuous bands that are substantially L shaped in cross section, one flange of each band being in substantially the plane of the flange of one of the aforesaid members, the other flanges of said bands overlapping each other and being attached to the periphery of the supporting plate.

6. A device of the character set forth comprising a supporting plate, a member secured to each side of the supporting plate and having a peripheral flange which is spaced from the adjacent surface of the supporting plate and inwardly from the edge thereof, a continuous band that is applied to the edge of the supporting plate, said band having a flange that is in substantially the same plane as the peripheral flange of one of the aforesaid members, and a flange at substantially right angles to the aforesaid flange that is provided with a bead for the reception of the edge of the supporting plate, the last mentioned flange extending beyond said bead, and a second band that is substantially L shaped in cross section and having a flange that is in substantially the plane of the flange of the other of the aforesaid members, and having also a flange that is at substantially right angles to the last mentioned flange and that is adapted to telescope over the extended portion of the beaded flange of the first mentioned band.

7. A device of the character set forth comprising a supporting plate, guides spaced apart and secured to said plate, and buttons slidable between said guides and normally confined against removal therefrom, one of said guides being interrupted by a space through which the buttons may be withdrawn, and a removable guide section for bridging said space.

8. A device of the character set forth comprising a supporting plate, guides spaced apart and secured to said plate, and buttons slidable between said guides and normally confined against removal therefrom, one of said guides being interrupted by a space through which the buttons may be withdrawn, and a guide section hingedly connected to the supporting plate for bridging said space.

9. A device of the character set forth comprising a supporting plate, members attached thereto having opposed edges which are spaced apart and from the supporting plate, and a plurality of buttons comprising each a pair of heads that are connected by a neck that is slidable between the edges of the aforesaid members, one of the aforesaid members being movably connected to the supporting plate whereby it may be moved away from the other to permit the removal of the buttons from between said members.

In testimony whereof, I hereunto affix my signature in the presence of two witnesses.

JOHN H. FOX.

Witnesses:
 ANDREAS F. SCHAEFER,
 J. P. SMITH.

Copies of this patent may be obtained for five cents each, by addressing the "Commissioner of Patents, Washington, D. C."